Sept. 20, 1966  C. VAN DER LELY ETAL  3,273,898
IMPLEMENTS FOR SPREADING POWDERED OR GRANULAR MATERIALS
Filed Oct. 25, 1963  8 Sheets-Sheet 1

Fig. 1

INVENTORS
Cornelis & Ary van der Lely
BY
Mason, Mason & Albright
Attorneys

Fig. 2

Sept. 20, 1966   C. VAN DER LELY ETAL   3,273,898
IMPLEMENTS FOR SPREADING POWDERED OR GRANULAR MATERIALS
Filed Oct. 25, 1963   8 Sheets-Sheet 3

INVENTORS
CORNELIS & ARY VAN DER LELY
BY
Mason, Mason & Albright
Attorneys

United States Patent Office 3,273,898
Patented Sept. 20, 1966

3,273,898
IMPLEMENTS FOR SPREADING POWDERED OR GRANULAR MATERIALS
Cornelis van der Lely, Zug, Switzerland, and Ary van der Lely, Maasland, Netherlands, assignors to C. van der Lely N.V., Maasland, Netherlands, a Dutch limited-liability company
Filed Oct. 25, 1963, Ser. No. 318,968
Claims priority, application Netherlands, Nov. 7, 1962, 285,225; June 5, 1963, 293,680; Sept. 6, 1963, 297,620
18 Claims. (Cl. 275—8)

This invention relates to implements for spreading powdered or granular materials such as artificial fertilizers or seeds, such implements being of the kind comprising a frame, a hopper for material to be spread and a rotatable spreading member arranged to be supplied with material from said hopper.

An object of the invention is the provision of a simple but effective implement having a robust frame constructed in such a way that it will not normally stand in the path of any substantial quantity of the material distributed by the implement during a spreading operation.

According to the invention, there is provided an implement of the kind set forth, wherein the spreading member is located beneath the hopper and the hopper and spreading member are supported by parts of the frame disposed respectively above and below the spreading member, and wherein said frame parts are interconnected by a part or parts extending vertically or approximately vertically alongside the spreading member in a single region only, the horizontal extent of said region measured in a direction perpendicular to the intended direction of travel of the implement being less than the horiozntal extents, measured in the same direction, of the frame parts disposed both above and below the spreading member.

For a better understanding of the invention, and to show how the same may be carried into effect, reference will now be made, by way of example, to the accompanying drawings, in which.

Figure 1:
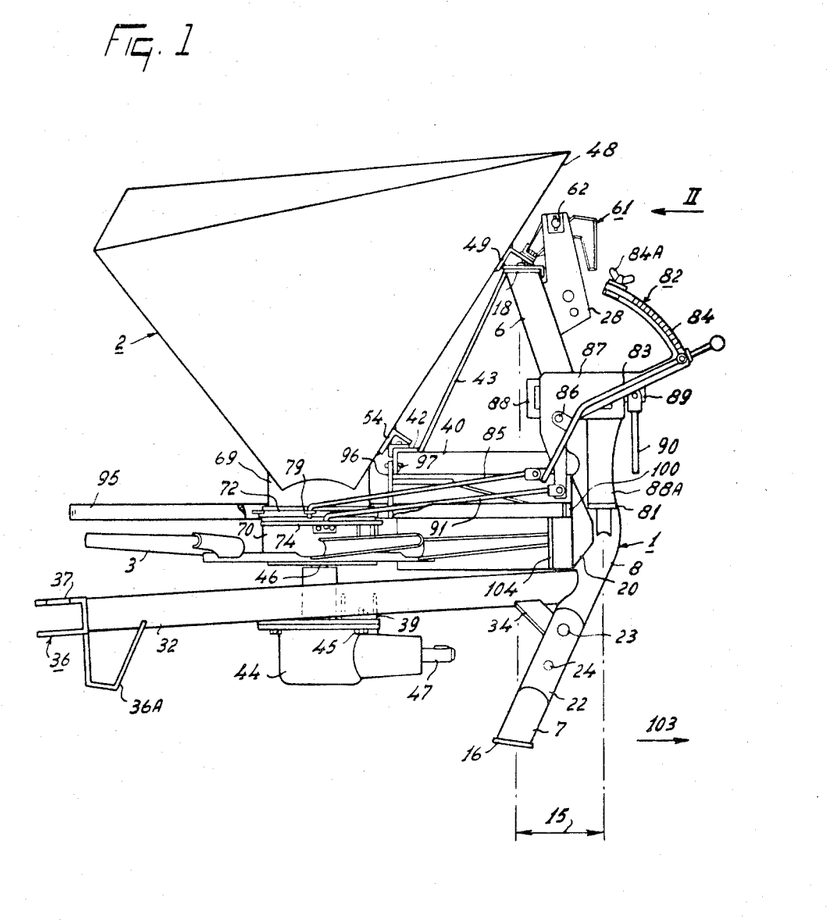
FIGURE 1 is a side elevation of a spreading implement in accordance with the invention.
Figure 2:
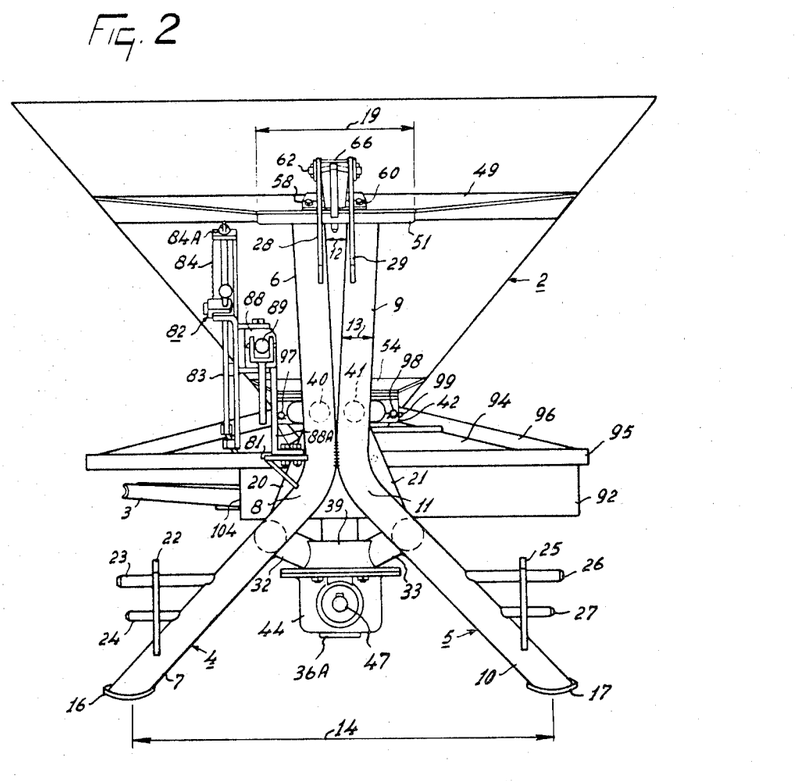
FIGURE 2 is a view as seen in the direction indicated by the arrow II of FIGURE 1.

Referring to FIGURES 1 to 7 of the drawings, the implement which is illustrated has a frame generally indicated by the reference numeral 1 arranged to support a container in the form of a hopper generally indicated by the reference numeral 2. The frame 1 also supports a spreading member or ejector 3 at a level below that of the hopper 2. The frame 1 has two upwardly extending tubular beams 4 and 5 that are arranged symmetrically on opposite sides of a vertical plane 46A (FIGURE 3) of approximate symmetry of the implement extending in the intended direction of travel thereof which is indicated by the arrow 103 in FIGURES 1 and 3. The beam 4 has two straight portions 6 and 7 that are integrally interconnected by a bend 8 in such a way that an angle having a magnitude in excess of 90° is enclosed between the portions 6 and 7. The beam 5 has straight portions 9 and 10 similarly interconnected by a bend 11. As can be seen in FIGURE 2, the bends 8 and 11 are in contact with one another and are welded together at this point. The upper straight portions 6 and 9 diverge upwardly away from the bends 8 and 11 so that their uppermost ends are spaced apart by a distance 12, this distance being approximately equal to the diameter 13 of one of the tubular beams 4 or 5.

The lower straight portions 7 and 10 of the beams 4 and 5 diverge downwardly away from the bends 8 and 11 in such a way that, when seen in front elevation (FIGURE 2), they are inclined to one another at an angle of about 90°. The lowermost ends of the two portions just mentioned are spaced apart by a distance 14 that is approximately equal to the diameter of the spreading member or ejector 3. As can be seen in FIGURE 1, all of the four portions 6, 7, 9 and 10 are rearwardly inclined from the bends 8 and 11 relative to the intended direction of travel 103. The longitudinal axes of the portions 6 and 7 at the free ends thereof and also those of the portions 9 and 10 at similar points are spaced rearwardly from the midpoints of the bends 8 and 11 by a distance 15 (FIGURE 1). The lowermost ends of the portions 7 and 10 carry foot plates 16 and 17 respectively. The uppermost ends of the portions 6 and 9 are interconnected by an approximately horizontal plate 18 (FIGURE 1), this plate having a width 19 (FIGURE 2) which is approximately equal to twice the distance between the relatively remote sides of the uppermost ends of the portions 6 and 9. The rigidity of the bends 8 and 11 is increased by the provision of strengthening plates 20 and 21 respectively.

Towards its lowermost end the straight portion 7 of the beam 4 is provided with an upwardly projecting strip 22 that is also fastened to the said portion by two horizontally projecting pins 23 and 24. The pin 23 is of greater diameter and greater length than the pin 24 and is located a short distance above the latter. As can be seen in FIGURE 2 of the drawings, both the pins 23 and 24 extend through the strip 22 and have free ends projecting beyond the said strip. The portion 10 of the beam 5 is provided with a strip 25 and with pins 26 and 27 that are symmetrically identical with the strip 22 and pins 23 and 24 respectively.

Figure 4:
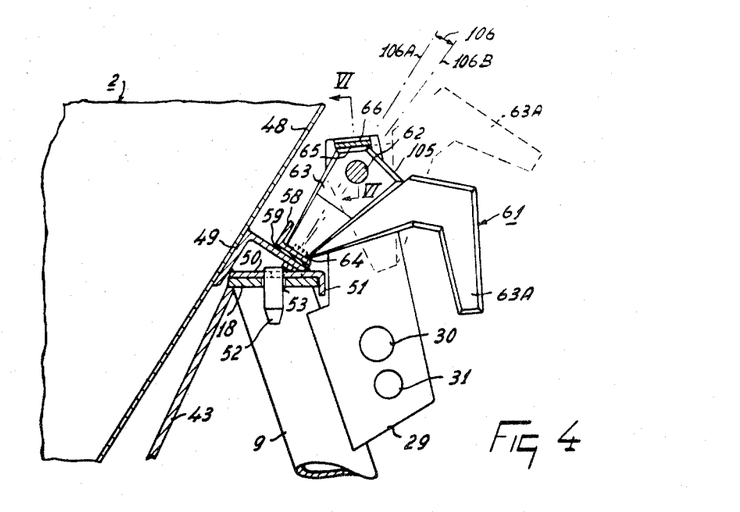
FIGURE 4 is a sectional side elevation showing certain parts of the implement to an enlarged scale and in greater detail.

The portions 6 and 9 of the beams 4 and 5 carry cheek plates 28 and 29 respectively, these plates projecting forwardly of the beams relative to the intended direction of travel 103 and being formed with two pairs of horizontally aligned holes 30 and 31 (FIGURE 4). The holes 30 are a little larger than the holes 31 and are located at a level above that of the latter.

Figure 5:
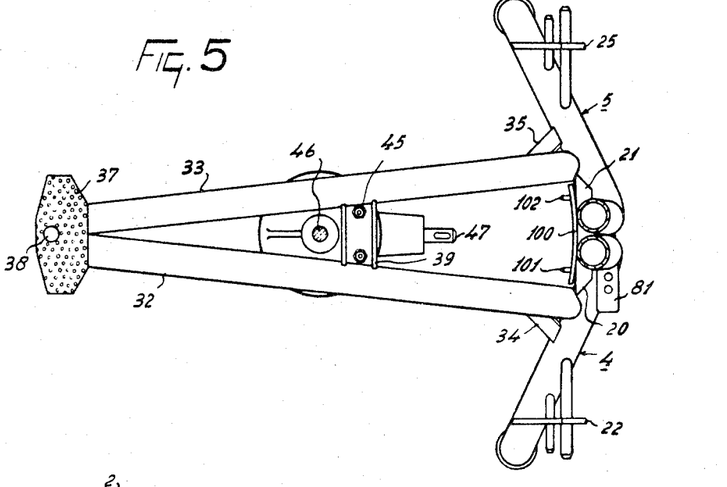
FIGURE 5 is a part-sectional plan view of the implement of FIGURES 1 to 4 with a number of the upper parts thereof removed.

Two approximately horizontal straight beams 32 and 33 are fastened to the beams 4 and 5 immediately below the respective bends 8 and 11, the beams 32 and 33 projecting rearwardly from the beams 4 and 5 relative to the direction 103. The connections between the beams 32 and 33 and the beams 4 and 5 respectively are strengthened by the provision of inclined struts 34 and 35 (FIGURES 1 and 5). The beams 32 and 33 are spaced apart at their leading ends and converge rearwardly of the direction 103 to intersect at their rearmost ends. A forked bracket 36 is rigidly mounted at this point, the upper limb 37 of the bracket having a substantially greater width than that of the lower limb and being roughened on its upper surface (see FIGURES 3 and 5) so as to form a step. A bent strip 36A is fastened to the lowermost sides of the beams 32 and 33 adjacent their rearmost ends, and also to the forked bracket 36, and affords a third foot adapted to be used in conjunction with the foot plates 16 and 17. An approximately vertically aligned pair of holes 38 is formed through the two limbs of the bracket 36. The two beams 32 and 33 are interconnected at very approximately their mid-points by a transverse channel-shaped beam 39 (FIGURES 1, 2 and 5).

Figure 3:
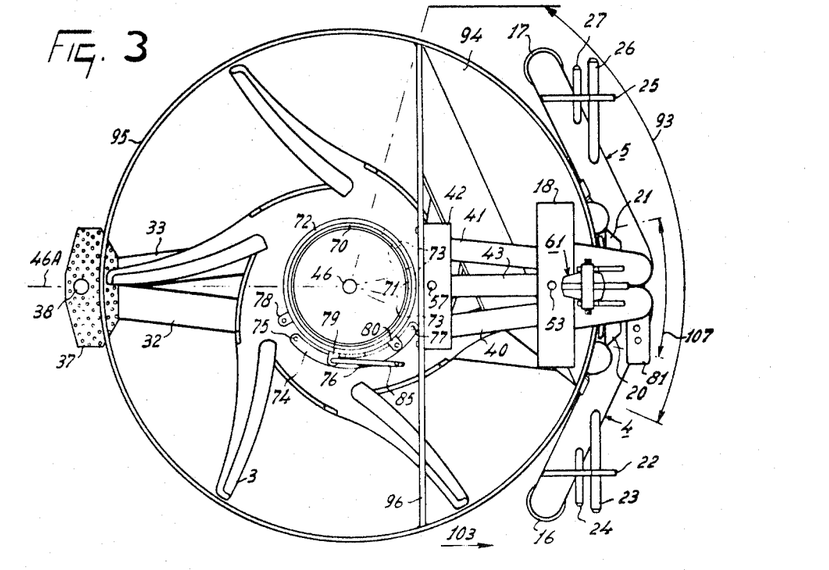
FIGURE 3 is a plan view corresponding to FIGURES 1 and 2 but with an upper part of the implement removed.

Two substantially horizontally disposed beams 40 and 41 diverge rearwardly, relative to the direction 103, from the beams 4 and 5 respectively at points immediately above the bends 8 and 11 (see FIGURES 2 and 3). The rearmost ends of the beams 40 and 41 are interconnected by a transverse beam 42 of inverted L-shaped cross-section whose opposite ends project a short distance beyond the relatively remote sides of the beams 40 and 41. An upwardly and rearwardly inclined strip 43 interconnects the centre of the rearmost edge of the horizontal limb of the beam 42 and the centre of the leading edge of the plate 18.

A gear casing 44 is fastened to the lower side of the beam 39 with the aid of bolts 45, the gear casing having an approximately vertically disposed output shaft 46 to the upper end of which the spreading member or ejector 3 is fastened and an approximately horizontally disposed input shaft 47 which projects forwardly from the casing 44 in the direction 103.

The hopper 2 has an upper portion 48 which is of approximately inverted pyramid shape, said portion being provided on its front side at a short distance below its uppermost edge with a horizontally extending bar 49 of L-shaped cross-section. As can be seen in the drawings, one limb of the bar 49 is welded or otherwise rigidly secured to the front side of the hopper portion 48. A horizontally disposed strip 50 (FIGURE 4) is rigidly secured to the limbs of the bar 49 and has its leading edge turned over downwardly so as to form a rim 51. As can be seen in FIGURE 4, the rearmost side of the rim 51 abuts against the leading edge of the plate 18. A downwardly projecting dowel 52 is rigidly mounted centrally of the strip 50 and is entered through a co-operating hole 53 formed in the plate 18.

Figure 7:
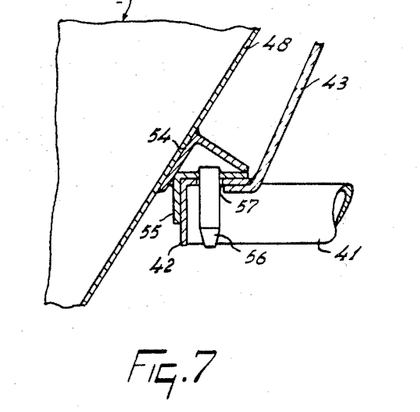
FIGURE 7 is a sectional side elevation taken in the same direction and to the same scale as FIGURE 4 and shows further details of the fastening of certain parts of the implement to one another.

Towards the lowermost end of the leading side of the hopper portion 48, a bar 54 of L-shaped cross-section is rigidly mounted in a similar manner to the previously described bar 49. A further bar 55 of L-shaped cross-section is rigidly secured to the limbs of the bar 54 in such a way that one of its own limbs is approximately horizontally disposed with the other limb projecting approximately vertically downwards from the rearmost edge thereof. As can be seen in FIGURE 7, the limbs of the bar 55 make abutting engagement above and behind the corresponding limbs of the similarly shaped beam 42. A downwardly projecting dowel 56 is rigidly secured at the centre of the horizontal limb of the bar 55 and is entered through a co-operating hole 57 formed centrally of the horizontal limb of the beam 42.

The uppermost side of the forwardly and downwardly projecting limb of the bar 49 (FIGURE 4) has a relatively short bar 58 of L-shaped cross-section secured to it with the aid of bolts 60 (FIGURE 2), a spacing strip or plate 59 being sandwiched between the limbs of the two bars 49 and 58.

Figure 6:
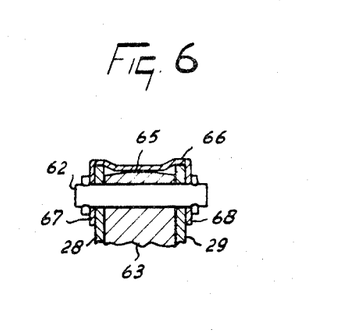
FIGURE 6 is a section taken on the line VI—VI of FIGURE 4.

A retaining mechanism for the hopper 2 is generally indicated by the reference numeral 61 and is located between the two cheek plates 28 and 29. The retaining mechanism 61 includes a clamp 63 (FIGURE 4) arranged so as to be turnable about a horizontal pivot pin 62 extending between the cheek plates 28 and 29. The lowermost side 64 of the clamp 63 bears against the upper side of the forwardly and downwardly projecting limb of the short bar 58 whilst its uppermost side 65 co-operates with a leaf spring 66 to tend to prevent it from turning about the pivot pin 62. As can be seen in FIGURE 6 of the drawings, the leaf spring 66 is of approximately inverted channel-shaped cross-section having an approximately horizontally extending web flanked on opposite sides by vertically extending limbs 67 and 68. The uppermost side 65 of the clamp 63 bears against the web of the spring 66 whilst holes are formed in the limbs 67 and 68 to register with holes formed in the respectively abutting cheek plates 28 and 29, the pivot pin 62 being entered through all the said holes and through a hole in the clamp 63 whereby the leaf spring 66 is retained in its appointed position. The clamp 63 has a further flat side 105 whose purpose will hereinafter be described and includes a handle 63A by which the whole clamp can be turned manually about the pivot pin 62.

The lowermost end of the portion 48 of the hopper 2 is connected to an outlet portion in the form of a cylindrical nozzle 69. The lowermost end of the nozzle 69 is, in turn, surrounded by an annulus 70 whose lowermost edge bears against the upper side of a central region of the spreading member or ejector 3. The annulus is formed with three relatively spaced outlet ports 71 (FIGURE 3) and is surrounded towards its upper end by a ring 72 carrying three downwardly projecting masking plates or shutters 73 each of which is adapted to co-operate with a corresponding one of the outlet ports 71 to close the latter to a chosen extent. A sector plate 74 (FIGURES 1 and 3) projects horizontally from the side of the annulus 70 and is formed with three angularly spaced holes 75, 76 and 77. The ring 72, on the other hand, is provided with three separate horizontally projecting and angularly spaced apertured lugs 78, 79 and 80.

The beam 4 carries a support 81 at the level of the bend 8, the said support having an adjusting mechanism, generally indicated by the reference numeral 82, mounted thereon. The adjusting mechanism 82 includes a control lever 83 arranged to be turnable about a horizontal pivot pin 86 along a curved member 84 provided with a scale. A clamp 84A can be moved to any chosen position along the scale and retained in that position to prevent the control lever 83 from moving beyond it. The lowermost end of the control lever 83 is pivotally connected to one end of a coupling rod 85 whose opposite end is entered through the hole formed in one of the three lugs 78 to 80. In the setting of the implement which is shown in the drawings, the end of the coupling rod 85 remote from the control lever 83 is entered through the hole formed in the lug 79.

The pivot pin 86 is rigidly secured to a slide 87 which also carries the curved member 84. The slide 87 can be moved relative to a slotted housing 88 in a direction parallel to the direction 103 with the aid of a screw-threaded spindle 89 only the leading end of which can be seen in FIGURES 1 and 2 of the drawings. The spindle 89 is arranged to be turned by a pivotally mounted handle 90 that normally occupies the position shown in the drawings so as to prevent rotation of the spindle 89 under the action of gravity. It will be evident that the spindle 89 is mounted in the housing 88 so as to be rotatable but substantially axially immovable whilst the slide 87 engages the spindle with the aid of a correspondingly screw-threaded block or the like (not visible) so that, upon rotation of the spindle, the block and slide 87 must move along the slotted housing 88 in an appropriate direction. The lowermost end of the slide 87 is pivotally connected to one end of a coupling rod 91, the opposite end of this coupling rod being bent over and entered in one of the holes 75 to 77 formed in the sector plate 74. In the setting of the implement which is shown in the drawing, the bent-over end of the coupling rod 91 is entered in the centre hole 76. A pillar 83A is employed to rigidly interconnect the housing 88 and the support 81.

An arcuately curved screening baffle 92 is arranged around a portion of the periphery of the spreading member or ejector 3, the said baffle subtending an angle 93 (FIGURE 3) having a magnitude of about 90° at the axis of the output shaft 46 of the gear casing 44. The screening baffle 92 is fastened to the curved edge of a screening plate 94 (FIGURE 3) that lies over and above a portion of the spreading member or ejector 3. Both the baffle 92 and the plate 94 are fastened to a circular guard 95 which has a slightly greater diameter than that of the ejector 3 and which is arranged immediately above the latter so as to be concentric therewith. An arched strip 96 (FIGURES 2 and 3) has its opposite ends connected to the concave side of the guard 95 and extends in chordwise relationship relative to the latter. The uppermost central region of the arched strip 96 carries two dowels 97 and 98 that are entered in matching holes formed in the substantially vertically disposed limb of the beam 42. As can be seen in FIGURES 1 and 2 of the drawings, small transverse bores are formed through the dowels 97 and 98 towards the tips thereof and resilient retaining clips 99 are entered through these bores to prevent the strip 96 from becoming detached from the beam 42. An arcuately curved strip 100 (FIGURES 1 and 5) is rigidly secured to the rearmost sides of the strengthening plates 20 and 21 and carries two rearwardly projecting dowels 101 and 102. The dowels are entered through matching holes formed in the circular guard 95.

In the use of the implement which has been described, it is coupled to the lifting links of the three-point lifting device of a tractor or other propelling vehicle. The free ends of the lower lifting links of the lifting device are engaged with the pins 23 and 26 whilst a horizontal pivot pin is employed to connect the free end of the adjustable upper lifting link to the cheek plates 28 and 29 by means of the aligned holes 30. If necessary, the slightly smaller diameter pins 24 and 27 and holes 31 may be employed to the same end. The input shaft 47 of the gear casing 44 is coupled to the power take-off shaft of the tractor or other propelling vehicle with the aid of a transmission shaft having universal joints at its opposite ends. When the implement is lifted clear of the ground by means of the lifting device and moved over the same in the direction 103 with the ejector 3 rotating about the axis of the shaft 46, material from the hopper 2 which reaches the ejector 3 will be spread radially outwardly from the latter due to the energy imparted to it as a result of the rotation of the ejector.

The material from the hopper 2, such as artificial fertiliser and seeds, reaches the ejector 3 through the outlet ports 71. These ports can be closed wholly, or to a desired extent, by the masking plates or shutters 73 so that the volume of material per unit time which is distributed by the implement can be controlled. It will be apparent that, assuming a constant speed of travel of the implement, the volume of material per unit area of ground will be similarly controlled.

In the setting of the annulus 70 which is illustrated in the drawings, the outlet ports 71 are disposed towards the front side of the implement relative to he direction 103, this arrangement being such that the major part of the material actually leaves the ejector 3 towards the rear side of the implement and is spread approximately equally on opposite sides of the aforementioned vertical plane 46A of approximate symmetry of the implement. The screening baffle 92 prevents any material from being thrown forwardly on to the tractor or other propelling vehicle. The guard 95 prevents the driver of the tractor or other vehicle from accidentally touching the rotating ejector 3 and also prevents the latter from fouling any objects which the implement may touch.

The position of the strip of ground upon which material falls relative to the plane 46A can be varied by turning the annulus 70 around the cylindrical outlet nozzle 69 of the hopper 2. A fine adjustment in this respect is effected by turning the spindle 89 in an appropriate direction with the aid of the handle 90. It will be evident that this will cause the slide 87 to move slowly in one or other direction along the housing 88, this movement being transmitted to the annulus 70 by way of the coupling rod 91 and the sector plate 74. It is also possible to effect a coarse adjustment of the angular setting of the annulus 70 about the nozzle 69 by removing the bent-over end of the coupling rod 91 from the hole 76 and turning the annulus 70 manually about the nozzle 69 until the end of the coupling rod can be entered in either the hole 75 or the hole 77. It will be evident from FIGURE 3 of the drawings that, when the hole 75 is employed, the outlet ports 71 will be disposed on the left-hand side of the plane 46A relative to the direction 103 whereby the material will be spread by the ejector 3 substantially wholly on the right-hand side of the said plane. The material will, in fact, be ejected over an arc commencing at the end 104 (FIGURES 1 and 2) of the screening baffle 92 which end is located immediately to one side of the bend 8 in the frame beam 4. It will be evident that, in order to bring the annulus 70 to a setting in which the material is spread substantially wholly on the left-hand side of the plane 46A, the coupling rod 91 must be entered in the hole 77.

Coarse adjustments of the ring 72 carrying the masking plates or shutters 73 about the nozzle 69 are effected by disengaging the bent-over end of the coupling rod 85 from the hole in the lug 79 and entering it in either the hole in the lug 78 or the hole in the lug 80 depending upon whether the coupling rod 91 is entered in the hole 75 or the hole 77. Fine adjustments of the angular setting of the ring 72 are effected whichever of the three lugs 78 to 80 is employed by turning the control lever 83 about the pin 86 and along the curved member 84 having the scale. It will be evident from FIGURE 1 of the drawings that this movement is transmitted to the ring 72 by way of the coupling rod 85. The clamp 84A is employed to retain the control lever 83 in register with any chosen mark on the scale.

The shape of the frame 1 is such that its width is at a minimum at about the level of the ejector 3. The horizontal width of the implement as seen in the direction indicated by the arrow II of FIGURE 1 (see FIGURE 2) is least at the level of the interengaging bends 8 and 11 and progressively increases above and below this level. It is only throughout an angle 107 (FIGURE 3) of not more than 60° and having an actual magnitude of about 23° that there are any parts of the frame which lie in the path of material ejected radially by the spreading member 3. The said parts are located in front of the spreading member or ejector 3 and the construction and arrangement are such that material can be spread from the implement in any one of a number of different directions without any substantial proportion of it coming into contact with the frame. This is conducive to the uniform distribution of the material over the surface of the ground.

When the implement is not in use, it can stand on the ground by means of the foot plates 16 and 17 and the bent strip 36A. The upper limb 37 of the forked bracket 36 serves as a step and may be used when, for example, the implement is connected to the three-point lifting device of a tractor or other vehicle and the hopper 2 is being filled with a fresh supply of material. The hopper 2 can be removed from the implement as a whole merely by turning the clamp 63 about the pivot pin 62 in an anti-clockwise direction as seen in FIGURE 4, by means of the handle 63A, until the said clamp reaches the position shown in broken lines in FIGURE 4. When this position is reached, the aforementioned flat side 105 of the clamp will abut against the web of the leaf spring 66. All that is then necessary to remove the hopper 2 is to lift it vertically off the ejector 3, the dowels 52 and 56 sliding vertically out of the holes 53 and 57 respectively. After the removal of the hopper 2, the annulus 70 and ring 72 can also be removed merely by disengaging the coupling rods 85 and 91 therefrom and lifting them off the ejector 3.

The guard 95 and the parts to which it is secured can also be removed readily from the implement by withdrawing the resilient retaining clips 99 from the holes in the dowels 97 and 98 and subsequently moving the guard 95 a short distance to the rear relative to the direction 103. This movement disengages the dowels 97 and 98 from the holes in the beams 42 and also the dowels 101 and 102 from the holes in the guard 95 itself. The ready removal of the various parts of the implement that have just been mentioned greatly facilitates easy cleaning of the whole implement which, obviously, lengthens the life of the implement and improves its effectiveness in use. If desired, two or more alternative hoppers of somewhat different shapes can be provided for use with the same implement, the ready removal of each hopper in the manner which has just been described making the interchange of different hoppers a quick and simple operation.

Fastening of the hopper 2 in its operative position with the aid of the retaining mechanism 61 is easily effected. Referring to FIGURE 4 of the drawings, the short bar 58 is constructed and arranged in such a way that a line 106A extending perpendicularly from the surface of the bar which is contacted by the mid-point of the lowermost side 64 of the clamp 63 is inclined at a relatively small angle 106 to a further line 106B extending between the point of intersection of the line 106A with the side 64 and the longitudinal axis of the pivot pin 62. The line 106B is, of course, contained in the same substantially vertical plane as the line 106A. As will be evident from the foregoing description, the leaf spring 66 tends to maintain the clamp 63 in the position shown in full lines in FIGURE 4 but said clamp would remain in that position in any case since the perpendicular distance between the longitudinal axis of the pivot pin 62 and the mid-point of the side 64 is greater than the minimum distance between said axis and the surface of the bar 58 which is engaged by the side 64. If, after a substantial period of use, one or both of the abutting faces of the bar 58 and side 64 become worn, this can be readily compensated for merely by providing a new and thicker spacing strip or plate 59.

Although the implement which has been described has a screening baffle 92, a screening plate 94 and a circular guard 95, an implement in accordance with the invention may, if desired, omit the guard 95 or, alternatively, omit the parts 92 and 94 whilst retaining the guard 95. When a large area of ground is to be spread with powdered or granular material with the aid of the implement which has been described, a wagon or the like containing a bulk supply of the material can be hitched to the forked bracket 36 by means of a vertical pin entered through the holes 38. The hopper 2 can then be filled from the wagon or the like without having to return to a specific loading point.

The implement which is illustrated in FIGURES 8 to 11 of the drawings is basically similar to the implement which has already been described and, accordingly only those parts of the implement which are different from those already mentioned will be described in detail, the other parts being indicated by the same reference numerals as previously employed. The principal variation in the implement of FIGURES 8 to 11 relative to the implement of FIGURES 1 to 7 is that the previously described circular guard 95 is replaced by a guide member in the form of a casing 111. The casing 111 is comprised by two substantially identical parts 112 and 113 that are disposed on relatively opposite sides of plane 148 (FIGURE 9) corresponding to the previously mentioned plane 46A (FIGURE 3). The part 113 includes a plate 114 disposed above the ejector 3 and a plate 115 disposed beneath the ejector 3, the edges of these two plates being interconnected by a curved rim 116 whose centre of curvature coincides with the axis of rotation of the ejector 3. The upper plate 114 has an extension 117 provided with opposite side walls 118 and 119 which project approximately vertically downwardly therefrom. The parts 117, 118 and 119 together form a delivery nozzle that extends substantially perpendicular to the intended direction of travel 103. The plates 114 and 115 both have radially inner edges 120 that are spaced from the axis of rotation of the ejector 3 by the same distance. The radially outermost edge of the plate 115 is joined to the lowermost edge of the curved rim 116.

A distribution flap 121 is provided at the outlet of the delivery nozzle and is pivotally connected to the side walls 118 and 119 of the latter. A strip 122 (FIGURE 10) is fastened to one end of the flap 121 whilst an acurately curved strip 124 is fastened to the adjoining side wall 119. The centre of curvature of the strip 124 coincides with an approximately horizontal pivotal axis afforded by pivots 123 interconnecting the flap 121 and the side walls 118 and 119. The curved strip 124 is formed with a row of holes 125 whilst the strip 122 is formed with two holes 126 and 127 that are spaced apart from the said pivotal axis by the same distance as are all the holes 125. The perpendicular distance 128 between the centres of the two holes 126 and 127 is one and a half times the perpendicular distance 129 between the centres of two neighbouring holes 125.

Figures 9, 11:
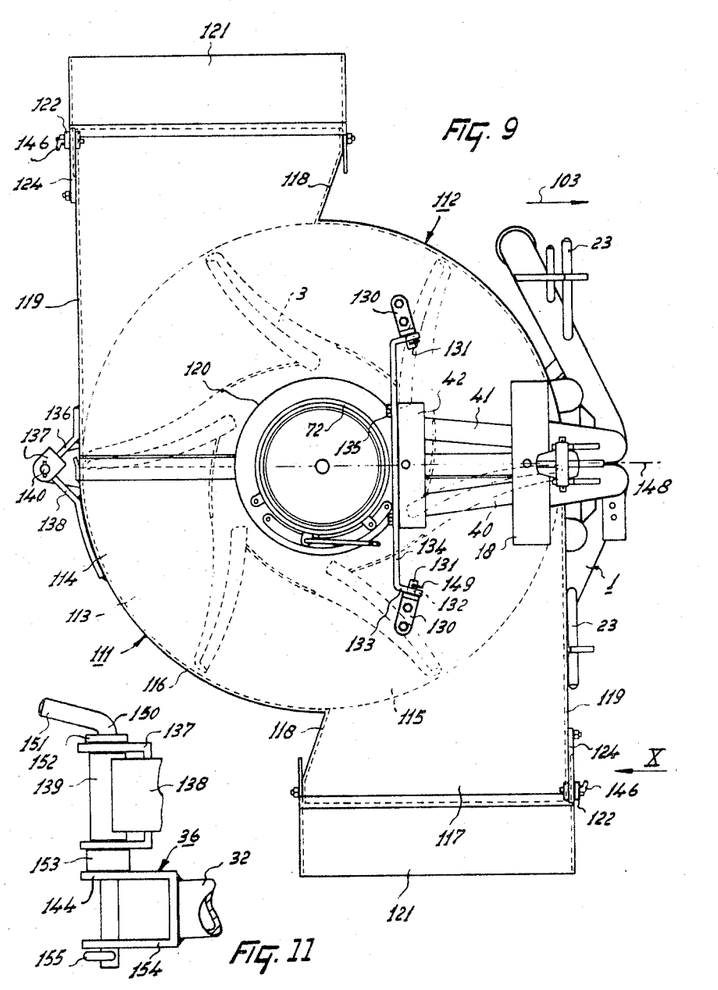
FIGURE 9 is a plan view corresponding to FIGURE 8 but with certain upper parts of the implement removed for the sake of clarity.
FIGURE 11 is a side elevation, to an enlarged scale, showing an alternative embodiment of certain parts of the implement that can be seen in FIGURES 8 and 9.

The upper plate 114 of the casing 111 carries a connecting member in the form of a strip 130 having a vertically disposed portion upon which a horizontally projecting dowel 131 is rigidly mounted. The dowel 131 is entered through a matching hole 132 formed in the bent-over end 133 of a transverse bracket 134 that is fastened to the beam 42 with the aid of bolts 135. A small transverse hole is formed through the dowel 131 towards the tip thereof and a resilient retaining clip 149 has one of its limbs entered through the said hole to prevent disengagement of the dowel 131 from the hole 132 in the bent-over end 133. As can be seen in FIGURE 9 of the drawings, the opposite end of the transverse bracket 134 co-operates with a connecting member in the form of a further strip 130 carried by the upper plate 114 of the part 112.

One end of a strip 136 is fastened to the side of the part 112 of the casing 111, the opposite end of the said strip carrying a forked bracket 137. A further bent strip 138 has one end secured to the side of the part 113 of the casing 111 and the opposite end of this strip carries a vertically disposed sleeve 139 that is entered between the vertically spaced limbs of the forked bracket 137. The said limbs are formed with vertically aligned holes that register with the sleeve 139 and also with the holes 38 formed in the limbs of the underlying bracket 36. An approximately vertical pivot pin 140 is entered through the holes in the limbs of the bracket 137, the sleeve 139 and the hole 38 in the uppermost limb 144 of the forked bracket 36, this limb not being widened to form a step as in the case of the previously described limb 37. Small transverse pins 141 and 142 are entered through bores formed in the pivot pin 140 immediately above and below the limbs of the bracket 137 so that the pivot pin 140 cannot move axially relative to the bracket. A ring 143 is secured to the pivot pin 140 immediately above the limb 144 whilst a resilient retaining clip 145 is entered through a transverse hole formed in the pivot pin immediately below the limb 144 The pivot pin 140 cannot therefore move axially to any substantial extent relative to the limb 144.

Figures 8, 10:
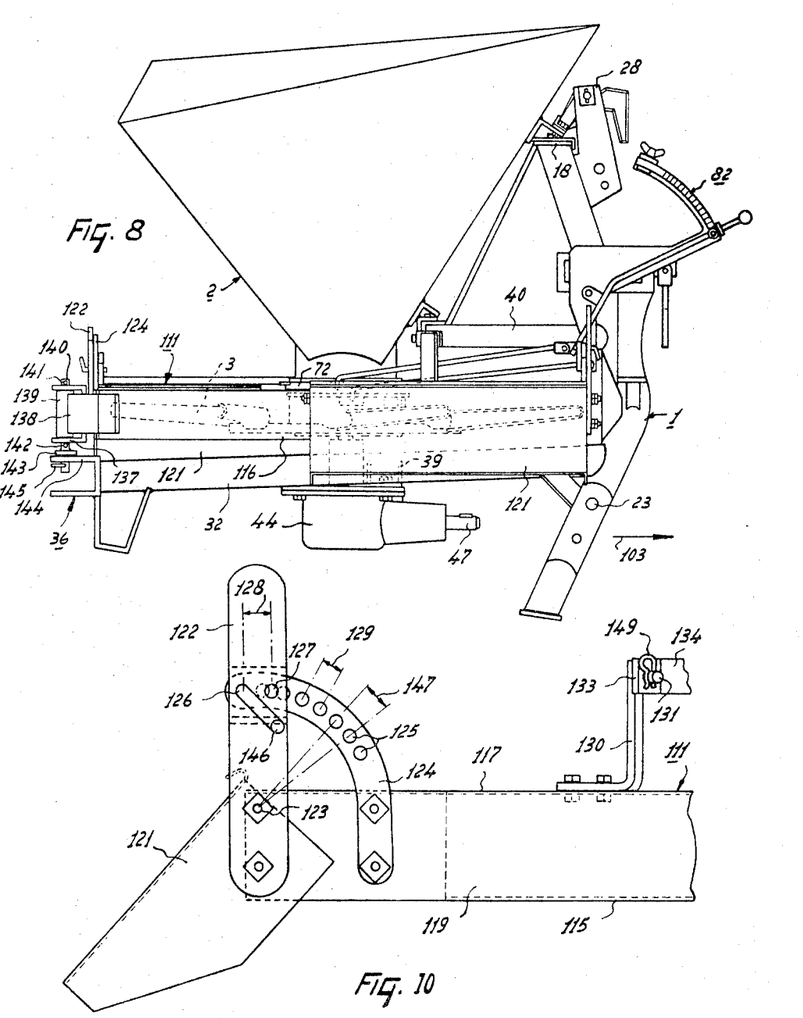
FIGURE 8 is a side elevation of an alternative embodiment of an implement in accordance with the invention.
FIGURE 10 is a scrap view, to an enlarged scale, as seen in the direction indicated by the arrow X of FIGURE 9.

During the use of the implement, material from the hopper 2 reaches the spreading member or ejector 3 by way of the outlet ports 71 of the annulus 70 and is subsequently thrown radially outwardly towards the delivery nozzles afforded by the parts 117 to 119. The material is thus spread on two separate areas of land lying on relatively opposite sides of the implement. The distribution flaps 121 have inclined surfaces that direct any material which strikes them downwardly towards the ground. The flaps 121 can be angularly adjusted about their pivots 123 and it will be evident that this adjustment can be employed to influence the distances that the two areas upon which the material falls are spaced from the opposite sides of the implement. As can be seen in FIGURE 10 of the drawings, a horizontal locking pin 146 is provided for entry through either the hole 126 or the hole 127 and a chosen one of the row of holes 125. The holes chosen determine the angular setting of the corresponding flap 121 about its pivots 123. Neighbouring holes 125 are spaced apart from one another by the afore-mentioned distance 129, this distance subtending an angle 147 at the axis afforded by the pivots 123. When it is desired to turn the flap 121 about the pivots 123 through an angle having only half the magnitude of the angle 147, this can be achieved by withdrawing the locking pin 146 from the two holes in which it is entered, turning the said flap 121 and strip 122 about the pivots 123 through the angle concerned and re-entering the locking pin 146 through the other one of the two holes 126 and 127 as the case may be and a fresh hole 125 which will then be in register therewith.

The two parts 112 and 113 of the casing 111 engage one another along lines that are contained in the afore-mentioned plane 148, this plane also containing the longitudinal axis of the pivot pin 140. Access may be had to the ejector 3 by turning the two parts 112 and 113 relative to one another about the pivot pin 140, such turning movements being normally prevented by the provision of the resilient retaining clips 149. The whole of the casing 111 can be removed readily from the implement after turning the two parts thereof relative to one another about the pivot pin 140 merely by withdrawing the resilient retaining clip 145 and lifting the whole casing, together with the pivot pin 140, clear of the limb 144 of the bracket 36.

FIGURE 11 of the drawings shows an alternative embodiment of the pivotal connection between the two parts 112 and 113 of the casing 111, the pivot pin 140 being replaced by a combined vertical pivot pin and locking pin 150 having a handle 151 at its uppermost end. A ring 152 is secured to the pin 150 immediately beneath the handle 151 whilst a spacing ring 153 is arranged loosely around the pin 150 between the lowermost limb of the bracket 137 and the uppermost limb 144 of the bracket 36. The pin 150 is longer than the pin 140, its lowermost end being entered through the hole 38 formed in the lowermost limb 154 of the bracket 36. A transverse bore is formed through the pin 150 adjacent the tip thereof and a resilient retaining clip 155 is entered through the said bore to prevent the pin 150 from being moved axially upwards. When it is desired to hitch a wagon or the like to the implement for the purpose previously described, the resilient retaining clip 155 is withdrawn and the pin 150 lifted to such an extent that its tip is raised clear of the limbs of the bracket 36. Upon entering the apertured draw-bar of the wagon or the like between the limbs 144 and 154, the pin 150 is pushed back into the position shown in FIGURE 11 and the resilient retaining clip 155 replaced. When required, the pin 150 can be completely removed from the brackets 137 and 36 so that the two parts 112 and 113 of the casing 111 can be separated from one another.

Figure 12:
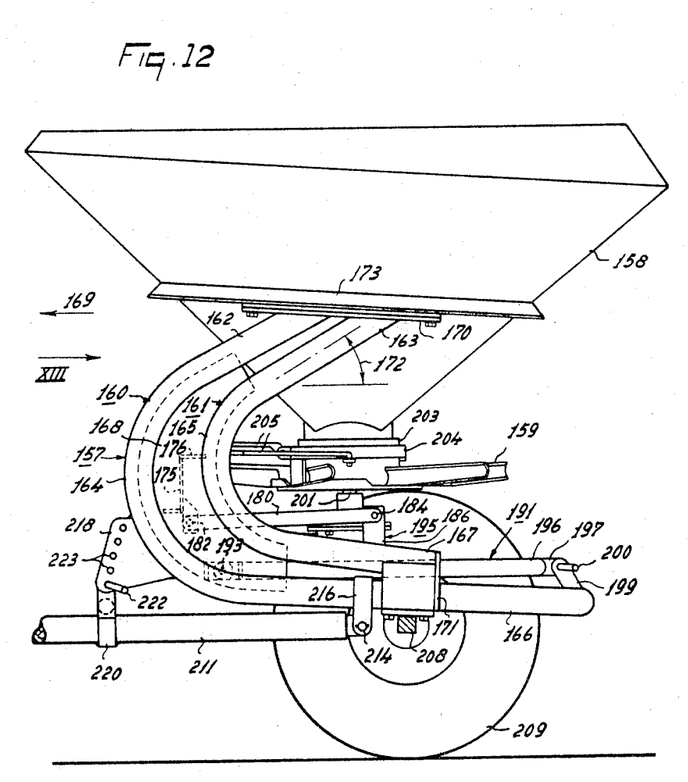
FIGURE 12 is a side elevation of a third embodiment of an implement in accordance with the invention.
Figure 13:
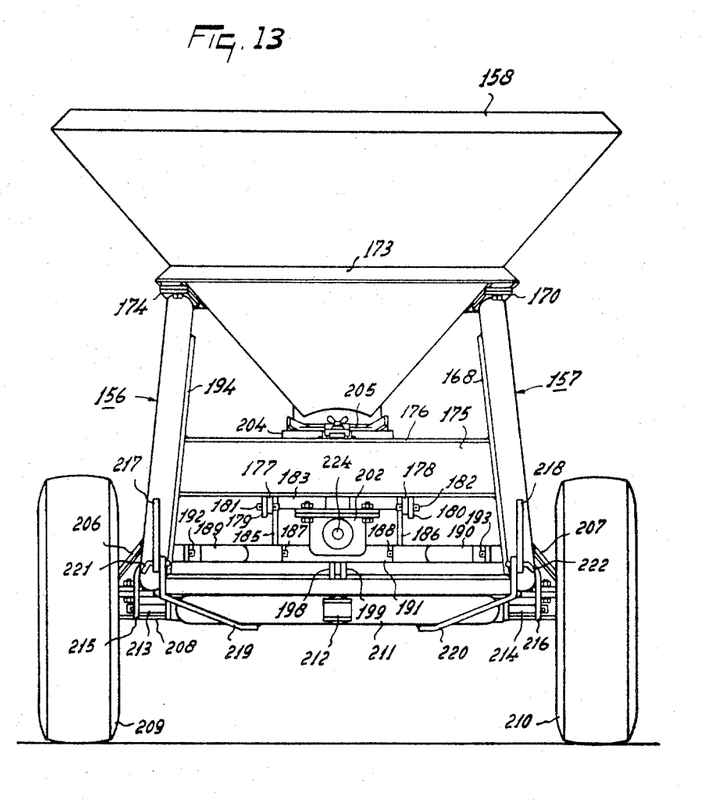
FIGURE 13 is a view as seen in the direction indicated by the arrow XIII of FIGURE 12.

The implement which is shown in FIGURES 12 and 13 of the drawings is an artificial fertiliser spreader in accordance with the invention and has a frame that includes two principal parts 156 and 157 that lie on relatively opposite sides of the implement. An upper region of the frame supports a hopper 158 whilst a lower region thereof supports a spreading member or ejector 159. The frame parts 156 and 157 are disposed closer to one another at a level above that of the ejector 159 than they are below the same, the said parts being symmetrically identical with one another. The part 157 includes two beams 160 and 161 having straight upper portions 162 and 163 respectively that are both inclined to the horizontal, bends 164 and 165 and approximately horizontal lower portions 166 and 167 respectively. The two beams 160 and 161 are interconnected in the regions of the bends 164 and 165 by a strengthening plate 168. The upper end portions 162 and 163 extend substantially parallel to one another at one side of the hopper 158 and are both inclined to the horizontal at an angle 172 having a magnitude of about 30°. The uppermost extremities of the portions 162 and 163 are interconnected by an approximately horizontal strip 170 that extends substantially parallel to the intended direction of travel of the implement which is indicated by the arrow 169 in FIGURE 12. The lower end portions 166 and 167 of the two beams 160 and 161 are interconnected by an approximately vertically disposed strip 171. The beam 160 is located in front of the beam 161 relative to the direction 169 and the concave sides of both the bends 164 and 165 of these two beams are located rearwardly with respect to the said direction. Thus, all the portions 162, 163, 166 and 167 project rearwardly from the bends 164 and 165 relative to the direction 169.

A framework 173 is secured to the hopper 158 so as to surround the same, said framework bearing upon the strip 170 and also upon the equivalent strip 174 (FIGURE 13) which is a member of the frame part 156. The frame parts 156 and 157 are interconnected laterally by a vertically disposed screening plate 175 to the uppermost edge of which a further horizontally disposed and rearwardly projecting plate 176 is fastened. Two lugs 177 and 178 project downwardly from the lowermost edge of the screening plate 175 and the ends of arms 179 and 180 respectively are turnably connected to the said lugs with the aid of horizontally aligned pivot pins 181 and 182. The opposite ends of the arms 179 and 180 are interconnected by a transverse beam 183, this beam being turnably coupled to both arms by horizontal pivot pins 184. The uppermost ends of two vertically disposed strips 185 and 186 are turnable about the respective pins 184 whilst their lowermost ends are turnably connected by further horizontal pivot pins 187 and 188 repsectively to the limbs 189 and 190 of an approximately horizontally disposed and approximately U-shaped beam 191. The pins 187 and 188 are located very approximately midway along the lengths of the two limbs 189 and 190 whilst the extreme free ends of the limbs are turnably connected to the strengthening plate 168 and to the equivalent strengthening plate 194 of the frame part 156 by horizontal pivot pins 192 and 193. The arms 179 and 180, together with the beam 191 and the parts interconnecting the same together constitute a supporting structure for the spreading member or ejector 159, this supporting structure being generally indicated in FIGURE 12 of the drawings by the reference numeral 195. The supporting structure 195 takes the form of a parallelogram linkage which is turnable about the fixed pivots afforded by the pins 181, 182 and 192, 193.

A strip 197 projects rearwardly of the implement from the base 196 of the U-shaped beam 191, the free end of the said strip being sandwiched between two lugs 198 and 199 that project upwardly and forwardly from a transverse beam (not visible in the drawings) interconnecting the rear ends of the portions 166 of the two frame parts 156 and 157. The strip 197 and lugs 198 and 199 are formed with holes which can be brought into horizontal register and through which a horizontal locking pin 200 can be entered as shown in FIGURE 12 to retain the supporting structure 195 in the position shown in the same figure. The spreading member or ejector 159 which is supported by the structure 195 is mounted on a rotatable shaft 201 that affords the output shaft of a gear casing 202 that is bolted to the transverse beam 183. The gear casing 202 has an approximately horizontal input shaft 224 that projects forwardly of the implement in the direction 169.

An annulus 203 surrrounds a cylindrical outlet portion of the hopper 158 and bears with its lowermost edge upon the upper surface of the ejector 159. The annulus 203 is formed with a number of outlet ports and is itself surrounded by a masking member in the form of a ring 204 carying a number of masking plates or shutters adapted to co-operate with the outlet ports of the annulus 203 to open or close the same to a chosen extent. Adjusting mechanism 205 which will not be described in detail since it is basically similar in operation to the previously described adjusting mechanism 82 is provided to enable the annulus 203 and ring 204 to be angularly adjusted in common, or relative to one another, about the axis of the shaft 201. Triangular fastening members 206 and 207 are fastened to lower regions of the frame parts 156 and 157 respectively, the free ends of said fastening members having opposite end regions of a non-rotatable axle 208 rigidly secured to them. Ground wheels 209 and 210 are rotatably mounted at the opposite ends of the axle 208. Inverted U-shaped brackets 215 and 216 are mounted on the beams 160 of the frame parts 156 and 157 immediately in front of the axle 208 and a V-shaped draw-bar 211 has the free ends of the limbs of the V turnably connected to the said brackets with the aid of horizontal pivot pins 213 and 214 respectively. A hook 212 or other form of hitch is carried at the leading end or point of the V-shaped draw-bar 211 to enable the implement to be connected to the tow-bar of a tractor or other propelling vehicle. Plates 217 and 218 project forwardly from the bends 164 of the frame parts 156 and 157 respectively, each plate being formed with a number of holes 223 that are equally spaced from the corresponding pivot pin 213 or 214. Upwardly bent strips 219 and 220 are fastened to the respective limbs of the V-shaped draw-bar 211, the uppermost free end of each strip being formed with a hole which can be brought into register with any chosen one of the holes 223 formed in the corresponding plate 217 or 218. Horizontal locking pins 221 and 222 are provided for entry through registering holes to retain the draw-bar 211 in a corresponding angular setting relative to the frame of the implement.

In the use of the implement which has been described with reference to FIGURES 12 and 13 of the drawings, the hook 212 or other hitch is coupled to the tow-bar of a tractor or other propelling implement and the input shaft 224 of the gear casing 202 is placed in driven connection with the power take-off shaft of the same vehicle with the aid of an intermediate transmission shaft provided with universal joints. The ejector 159 is thus rotated about the longitudinal axis of the output shaft 201 and material which reaches the same from the hopper 158 is thrown centrifugally outwards to fall on to the ground. The amount of material per unit time which reaches the ejector 159 from the hopper 158 depends upon the open cross-sectional area of the outlet ports of the annulus 203. This area is determined by the setting of the adjusting mechanism 205. The shape of the frame parts 156 and 157 is such that a simple but rugged frame is obtained which can readily support a hopper having a capacity of about 800 kilograms. It will be seen from the drawings that the greater part of the circumference of the ejector 159 is clear of the various parts of the frame so that material can be spread in any one of a number of different directions relative to the implement without fouling the frame.

When it is desired to clean the implement, the locking pin 200 is withdrawn from the strip 197 and lugs 198 and 199 and the supporting structure 195 turned downwardly about the pivot pins 181, 182 and 192, 193. The gear casing 202 and ejector 159 will thus be moved downwardly but, due to the parallelogram formation of the structure 195, will retain their substantially horizontal inclination. The extent of downward movement is sufficient to bring the annulus 203 clear of the outlet portion of the hopper 158 so that, after lowering, it is only necessary to release the adjusting mechanism 205 from the annulus 203 and ring 204 to be able to lift the last-mentioned parts off the ejector 159.

The angular setting of the frame of the implement about the axle 208, and thus the inclination of the plane of rotation of the ejector 159 relative to the horizontal, can be adjusted for any particular operation by turning the draw-bar 211 about the pivot pins 213 and 214. The locking pins 221 and 222 are entered through suitable ones of the holes 223 to maintain a chosen setting.

What we claim is:

1. An implement comprising a hopper, a spreading member and a supporting frame, said spreading member positioned below said hopper, said frame having interconnected parts disposed above and below said spreading member for supporting said hopper and spreading member, said frame comprising two parts located on substantially opposite sides of the hopper, intermediate portions of said frame being substantially vertically disposed, said portions occupying the region laterally adjacent said spreading member, the upper ends of said frame being bent to form a support for said hopper and the lower ends of said frame being bent to form a support for said spreading member, said spreader being secured by vertically adjustable mounting means, said mounting means comprising a parallelogram linkage and pivotal means for adjusting the inclination of the hopper, spreader and spreader mounting means relative to the frame.

2. The invention of claim 1 wherein each of the two parts of said frame includes at least two beams, said beams being bent portions curved in approximately the same direction.

3. The invention of claim 1 wherein the hopper is provided with a surrounding framework and the framework is supported by the upper ends of said frame.

4. An implement comprising a hopper, a spreading member and a supporting frame, said spreading member positioned below said hopper, said frame having interconnected parts disposed above and below said spreading member for supporting said hopper and spreading member, the upper end of said frame forming a support for said hopper and said hopper being fixed to said support, said spreader being secured to said frame by vertically adjustable mounting means, said mounting means comprising a parallelogram linkage, a ring member with at least one outlet port and a closing member for closing the outlet port, said port being located between the lower end of the hopper and the spreading member, said linkage comprising means for displacing the spreading member relative to the hopper whereby the ring and the closing member can be removed from the device.

5. An implement for spreading powdery or granular material comprising a frame, a hopper for said material mounted on the frame, a rotary spreading member on the frame below said hopper, said hopper having a discharge opening communicating with said spreading member, said frame being substantially C-shaped in side elevation with its open ends facing rearwardly to permit discharge of material of said spreading member over a wide area without interference from said C-shaped frame, the hopper and the spreading member being swingably related to each other through hinge means on the C-shaped frame to increase the distance between the discharge opening of the hopper and the spreading member and permit cleaning of the spreader.

6. An implement as claimed in claim 5, wherein a locking member is provided to prevent the swinging movement of the spreading member relative to the hopper, said locking member being positioned at the rear end of the implement.

7. An implement as claimed in claim 6, wherein the C-shaped frame has two legs, one leg extending below the spreading member, the other leg extending above the spreading member, the locking member being positioned in side elevation at the end of one of the legs.

8. An implement as claimed in claim 7, wherein the discharge opening of the hopper is situated in side elevation about medially between the upper and lower leg of the frame.

9. An implement as claimed in claim 5, wherein the hopper is shaped as an inverted pyramid and rests on at least two sides of the frame.

10. An implement as claimed in claim 5, wherein in side elevation a gearbox is mounted on the implement above the lower end of the C-shaped frame, and the spreading member is situated about halfway within the C-shaped frame.

11. An implement as claimed in claim 5, wherein the C-shaped frame includes a pair of C-shaped frame parts, and running wheels for supporting the implement are mounted adjacent the lower ends of the C-shaped frame parts.

12. An implement for spreading powdery or granular material comprising a frame, a hopper for said material mounted on the frame, a rotary spreading member on the frame below said hopper, said hopper having a discharge opening communicating with said spreading member, said frame comprising a pair of substantially C-shaped planar generally vertically disposed plates on either side of the implement, means reinforcing each of said plates, said reinforcing means being provided at the rear and the front sides of the plates, the reinforcing means at the rear side being substantially C-shaped and including a portion extending forwardly from a position above said spreading member and rearwardly to a position below said spreading member to permit discharge of material by said spreading member over a wide area without interference from said plates and reinforcing means.

13. An implement as claimed in claim 12, wherein said portion of said reinforcing means extends forwardly and downwardly and said downwardly extending portion of said reinforcing means is inclined at about 30° with a horizontal plane.

14. An implement as claimed in claim 12, wherein said spreading member is arranged in a substantially horizontal plane, a substantially vertical cross plate member being provided between the plates forwardly of said spreading member.

15. An implement as claimed in claim 14, wherein said cross plate member is provided with reinforcing means at its upper and lower sides.

16. An implement as claimed in claim 12, wherein the hopper is shaped as an inverted pyramid and the four side walls of the hopper are provided at their upper sides with a rim portion which is inwardly inclined with respect to the remaining portion of said side walls.

17. An implement as claimed in claim 12, wherein beneath the hopper a structural member is provided situated in a substantially horizontal plane below said spreading member, said structural member supporting a gearbox for driving said spreading member, said gearbox being situated in side elevation at a higher level than the lower portion of said reinforcing means.

18. An implement as claimed in claim 12, wherein the reinforcing means of said side plates consists of tubular frame members.

References Cited by the Examiner

UNITED STATES PATENTS

| | | | |
|---|---|---|---|
| 1,166,477 | 1/1916 | Parrish | 275—15 |
| 1,769,302 | 7/1930 | MacGregor | 275—8 |
| 2,010,287 | 8/1935 | Anderson | 275—8 |
| 2,500,682 | 3/1950 | Hoffstetter | 275—8 |
| 2,594,084 | 4/1952 | Skibbe et al. | 275—8 |
| 2,652,261 | 9/1953 | Presler | 275—8 |

FOREIGN PATENTS

| | | |
|---|---|---|
| 43,369 | 11/1930 | Denmark. |
| 1,264,604 | 5/1961 | France. |

ABRAHAM G. STONE, *Primary Examiner.*

W. A. SMITH, III, *Assistant Examiner.*